(12) United States Patent
Hemmer et al.

(10) Patent No.: US 10,553,035 B2
(45) Date of Patent: Feb. 4, 2020

(54) VALENCE BASED IMPLICIT TRAVERSAL FOR IMPROVED COMPRESSION OF TRIANGULAR MESHES

(71) Applicant: GOOGLE INC., Mountain View, CA (US)

(72) Inventors: Michael Hemmer, San Francisco, CA (US); Ondrej Stava, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 71 days.

(21) Appl. No.: 15/612,689

(22) Filed: Jun. 2, 2017

(65) Prior Publication Data

US 2018/0350153 A1    Dec. 6, 2018

(51) Int. Cl.
*G06T 15/10* (2011.01)
*G06T 15/80* (2011.01)
(Continued)

(52) U.S. Cl.
CPC .............. *G06T 19/20* (2013.01); *G06T 9/001* (2013.01); *G06T 15/10* (2013.01); *G06T 15/80* (2013.01);
(Continued)

(58) Field of Classification Search
CPC ....... G06T 9/001; G06T 17/20; G06T 17/205; G06T 17/005; G06T 9/00; G06T 9/004;
(Continued)

(56) References Cited

U.S. PATENT DOCUMENTS 6,088,035 A    7/2000 Sudarsky et al.
6,167,159 A    12/2000 Touma et al.
(Continued)

FOREIGN PATENT DOCUMENTS

CN    102467753 B    10/2013
CN    102682103 B    3/2014
(Continued)

OTHER PUBLICATIONS

"A Rational Parameterization of the Unit Circle", Leaves of Math, retrieved on Aug. 26, 2016 from https://mathnow.wordpress.com/2009/11/06/a-rational-Parameterization-of-the-Unit-Circle/, Nov. 6, 2009, 4 pages.

(Continued)

Primary Examiner — Sing-Wai Wu
(74) Attorney, Agent, or Firm — Brake Hughes Bellermann LLP

(57) ABSTRACT

In one general aspect, a method can include receiving, by processing circuitry of a computer configured to represent information related to a three-dimensional object, a plurality of vertices of a triangular mesh representing the three-dimensional object, the triangular mesh including a plurality of faces, each if the plurality of faces including three vertices of the plurality of vertices; generating a traversal order for the vertices of the triangular mesh based on valences of the plurality of vertices; producing an array of errors between predicted vertices and vertices of the plurality of vertices, the array of errors being arranged in a sequence based on the traversal order; and performing a compression operation on the array of differences to produce a compressed error array, the compressed error array producing the plurality of vertices of the triangular mesh in response to a decompression operation.

18 Claims, 5 Drawing Sheets

(51) Int. Cl.
*G06T 19/20* (2011.01)
*G06T 9/00* (2006.01)
*H04N 19/27* (2014.01)
*H04N 19/30* (2014.01)
*H04N 19/61* (2014.01)

(52) U.S. Cl.
CPC ............. *H04N 19/27* (2014.11); *H04N 19/30* (2014.11); *H04N 19/61* (2014.11)

(58) Field of Classification Search
CPC ..... G06T 9/40; G06F 17/10; G06F 17/30371; G06F 17/5018
See application file for complete search history.

(56) References Cited

U.S. PATENT DOCUMENTS

| | | | |
|---|---|---|---|
| 6,204,854 | B1 | 3/2001 | Signes et al. |
| 6,262,737 | B1 | 7/2001 | Li et al. |
| 6,525,722 | B1 | 2/2003 | Deering et al. |
| 6,532,012 | B2 | 3/2003 | Deering et al. |
| 6,563,500 | B1 | 5/2003 | Seo et al. |
| 6,879,324 | B1 | 4/2005 | Hoppe et al. |
| 7,103,211 | B1 | 9/2006 | Medioni et al. |
| 7,280,109 | B2 | 10/2007 | Hoppe et al. |
| 7,283,134 | B2 | 10/2007 | Hoppe et al. |
| 7,804,498 | B1 | 9/2010 | Graham et al. |
| 8,022,951 | B2 | 9/2011 | Zhirkov et al. |
| 8,217,941 | B2 | 7/2012 | Park et al. |
| 8,390,622 | B2 | 3/2013 | Park et al. |
| 8,619,085 | B2 | 12/2013 | Keall et al. |
| 8,660,376 | B2 | 2/2014 | Ahn et al. |
| 8,736,603 | B2 | 5/2014 | Curington et al. |
| 8,805,097 | B2 | 8/2014 | Lee et al. |
| 8,811,758 | B2 | 8/2014 | Leed et al. |
| 8,884,953 | B2 | 11/2014 | Teng et al. |
| 8,949,092 | B2 | 2/2015 | Chen et al. |
| 9,064,311 | B2 | 6/2015 | Mammou et al. |
| 9,111,333 | B2 | 8/2015 | Jiang |
| 9,171,383 | B2 | 10/2015 | Lee et al. |
| 9,348,860 | B2 | 5/2016 | Cai et al. |
| 9,396,512 | B2 | 7/2016 | Karras |
| 9,424,663 | B2 | 8/2016 | Ahn et al. |
| 2004/0208382 | A1 | 10/2004 | Gioia et al. |
| 2011/0010400 | A1 | 1/2011 | Hayes et al. |
| 2012/0306875 | A1 | 12/2012 | Cai et al. |
| 2014/0168360 | A1 | 6/2014 | Ahn et al. |
| 2014/0303944 | A1 | 10/2014 | Jiang et al. |
| 2016/0086353 | A1 | 3/2016 | Zalik et al. |

FOREIGN PATENT DOCUMENTS

| | | |
|---|---|---|
| KR | 1019990085657 A | 12/1999 |
| KR | 1020010008944 A | 2/2001 |
| KR | 1020030071019 A | 9/2003 |
| KR | 100420006 B1 | 2/2004 |
| KR | 1020040096209 A | 11/2004 |
| KR | 1020050006322 A | 1/2005 |
| KR | 1020050006323 A | 1/2005 |
| KR | 1020060087631 A | 8/2006 |
| KR | 1020060087647 A | 8/2006 |
| KR | 1020060087662 A | 8/2006 |
| KR | 1020060088136 A | 8/2006 |
| KR | 1020080066216 A | 7/2008 |
| KR | 1020090025672 A | 3/2009 |
| KR | 1020090097057 A | 9/2009 |
| KR | 100927601 B1 | 11/2009 |
| KR | 1020100007685 A | 1/2010 |
| KR | 20100012724 A | 2/2010 |
| KR | 20100112848 A | 10/2010 |
| WO | 0045237 A2 | 8/2000 |
| WO | 2010111097 A1 | 9/2010 |

OTHER PUBLICATIONS

"Entropy encoding", Wikipedia, the free encyclopedia, retrieved from https://en.wikipedia.org/wiki/Entropy_encoding, Apr. 11, 2016, 1 page.
"Quantization", Wikipedia, the free encyclopedia, retrieved from https://en.wikipedia.org/wiki/Quantization, Apr. 11, 2016, 1 page.
Alliez, et al., "Progressive compression for lossless transmission of triangle meshes", Proceedings of the 28th annual conference on Computer graphics and interactive techniques, 2001, 8 pages.
Gandoin, et al., "Progressive lossless compression of arbitrary simplicial complexes", ACM Transactions on Graphics (TOG), Jul. 23, 2002, 20 pages.
Gumhold, et al., "Predictive point-cloud compression", ACM SIGGRAPH 2005 Sketches, Jul. 31, 2005, 1 page.
Huang, et al., "Octree-Based Progressive Geometry Coding of Point Clouds", SPBG Jul. 29, 2006: 103110., Jul. 29, 2006, 9 pages.
Isenburg, "Compression and Streaming of Polygon Meshes", dissertation, retrieved from http://cs.unc.edu/newspublications/doctoral-dissertations/abstracts-a-I/#Isenburg, 2005, 217 pages.
Merry, et al., "Compression of dense and regular point clouds", Computer Graphics Forum, Dec. 1, 2006, 7 pages.
Narkowicz, "Octahedron normal vector encoding", retrieved on Aug. 26, 2016 from https://knarkowicz.wordpress.com/2014/04/16/octahedron-normal-vector-encoding/, Apr. 16, 2014, 9 pages.
Rossignac, Jarek, et al., "Edgebreaker on a Corner Table: A Simple Technique for Representing and Compressing Triangulated Surfaces", Hierarchical and Geometrical Methods in Scientific Visualization. Mathematics and Visualization. Springer, Berlin, Heidelberg, 2003, 10 pages.
Schnabel, Ruwen, "Octree-based Point-Cloud Compression", Eurographics Symposium on Point-Based Graphics, 2006, 11 pages.
Waschbüsch, et al., "Progressive compression of point-sampled models", Eurographics symposium on point-based graphics, Jun. 2, 2004, 9 pages.
Chen, Dan et al., "Geometry Compression of Tetrahedral Meshes Using Optimized Prediction", 2005 13th European Signal Processing Conference, IEEE, Sep. 4, 2005, 4 pages, XP032759545.
Extended European Search Report for European Application No. 18175725.3, dated Jul. 16, 2018, 8 pages.
International Search Report and Written Opinion for PCT Application No. PCT/US2018/035075, dated Jul. 9, 2018, 14 pages.
Maglo, Adrien et al., "3D Mesh Compression: Survey, Comparisons, and Emerging Trends", ACM Computing Surveys, vol. 47, No. 3, Article 44, Feb. 17, 2015, 41 pages, XP058065741.

VALENCE BASED IMPLICIT TRAVERSAL FOR IMPROVED COMPRESSION OF TRIANGULAR MESHES

TECHNICAL FIELD

This description relates to compression of three-dimensional object data.

BACKGROUND

Some applications such as video games involve representing three-dimensional objects to a user. In one example, an adventure game played by a user in a virtual reality environment may require the generation of virtual trees, rocks, and people. In another example, a mapping application may require the representation of buildings. In some applications, each such object includes a triangular mesh having a plurality of vertices, e.g., points in space that form triangles. Such a triangular mesh includes a plethora of data that may be stored on disk and transmitted to the user. Practical implementations of storing and transmitting the triangular mesh data representing a virtual object include compressing the triangular mesh data.

SUMMARY

In one general aspect, a method can include receiving, by processing circuitry of a computer configured to represent information related to a three-dimensional object, a plurality of vertices of a triangular mesh representing the three-dimensional object, the triangular mesh including a plurality of faces, each if the plurality of faces including three vertices of the plurality of vertices. The method can also include generating, by the processing circuitry, a traversal order for the vertices of the triangular mesh based on valences of the plurality of vertices. The method can further include producing, by the processing circuitry, an array of errors between predicted vertices and vertices of the plurality of vertices, the array of errors being arranged in a sequence based on the traversal order. The method can further include performing, by the processing circuitry, a compression operation on the array of differences to produce a compressed error array, the compressed error array producing the plurality of vertices of the triangular mesh in response to a decompression operation.

The details of one or more implementations are set forth in the accompanying drawings and the description below. Other features will be apparent from the description and drawings, and from the claims.

DETAILED DESCRIPTION

A conventional approach to compressing triangular mesh data involves generating a traversal order for the vertices of the triangular mesh according to a deterministic formula. For example, a traversal order generated by the Edgebreaker algorithm begins at a specified face of the triangular mesh and proceeds to adjacent faces to the right, if possible.

In the above-described conventional approach to compressing triangular mesh data, the deterministic formula used to generate the traversal order for the vertices of the triangular mesh is arbitrary and is not optimal with respect to prediction errors that result from the traversal. Such prediction errors may be seen with respect to a parallelogram prediction; in this case, when traversal to any of several triangular faces, i.e., areas defined by triplets of vertices, is possible, there is no mechanism for the deterministic formula to produce as the next face that which would minimize the parallelogram prediction error. Larger prediction errors produce a larger entropy of the triangular mesh data to be compressed, which in turns results in a less efficient compression scheme.

In accordance with the implementations described herein, improved techniques of compressing triangular mesh data involve generating a traversal order for the vertices of the triangular mesh based on the valences of the vertices of the triangular mesh. A valence of a vertex of the triangular mesh is the number of vertices neighboring that vertex within the triangular mesh. A reason that the valences are useful in generating a traversal is that a decoder usually has no other information than the valences of the vertices and the connectivity of the triangular mesh. Nevertheless, a good indicator of whether prediction error throughout a traversed triangular mesh is small—and therefore of low entropy—is whether certain angles within a specified triangle and that of a vertex not in that triangle are similar. While such angles associated with vertices are not known to the decoder, the valences are known. In some implementations, identical valences can correlate well with similar angles. Accordingly, the traversal order chosen (e.g., defined) to reduce entropy is based on the valences of the vertices. The traversal order so generated would most likely select the vertex of the triangular mesh that minimizes prediction error. By minimizing this prediction error, a compression scheme using this traversal order is more efficient.

The above-referenced improved techniques improve the operation of a computer on which the compression occurs because the resulting increase in compression ratio increases decompression (i.e., decoding) efficiency as well as causes fewer computing and storage resources to be used. Although the examples shown herein are simplified for better explanation, in practical situations the amount of data used is large enough to render performance of the improved techniques on computer hardware mandatory.

Figure 1:
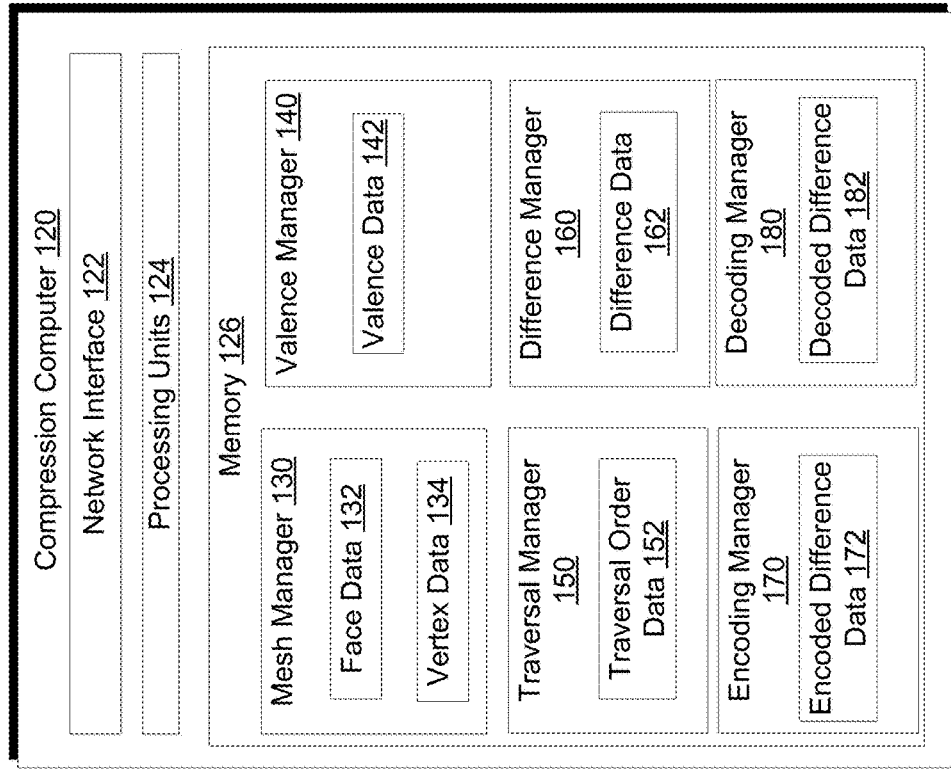
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes a compression computer 120.

The compression computer 120 is configured to compress data associated with a triangular mesh representing a three-dimensional object. The compression computer 120 includes a network interface 122, one or more processing units 124, and memory 126. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the compression computer 120 can be, or can include processors (e.g., processing units 124) configured to process instructions stored in the memory 126. Examples of such instructions as depicted in FIG. 1 include a mesh manager 130, a valence manager 140, a traversal manager 150, a difference manager 160, an encoding manager 170, and a decoding manager 180. Further, as illustrated in FIG. 1, the memory 126 is configured to store various data, which is described with respect to the respective managers that use such data.

The mesh manager 130 is configured to receive, store, and/or transmit triangular mesh data, including face data 132 and vertex data 134. Each of the vertices of the vertex data 134 includes an ordered triplet representing a point in space. (In general, the vertex data 134 can also include information such as texture coordinates and normal vectors, Further, the points may be represented in more than three dimensions or two dimensions.) In some implementations, each component of the ordered triplet is quantized, i.e., represented by a bit string of a specified length. In some implementations, the vertex data 134 also includes a vertex identifier for each vertex. In some implementations, the face data 132 includes a face identifier of a triangular face and the vertex identifiers of the three vertices that make up the triangular face. In some implementations, the mesh manager 130 is configured to receive the triangular mesh data from an external source over a network (not shown).

The valence manager 140 is configured to generate and store valence data 142 from the face data 132 and vertex data 134, under the assumption of the connectivity of the triangular mesh. In some implementations, the valence manager 140 generates the valence data 142 by counting (e.g., adding, summing, quantifying) the number of neighboring vertices in the triangular mesh. In some implementations, the valence data 142 is received by the mesh manager 130 rather than being generated by the valence manager 140. In some implementations, the valence data 142 is included in the vertex data 134.

The traversal manager 150 is configured to generate a traversal order 152 in which the vertices 134 are arranged for purposes of compressing the prediction error between a vertex and one predicted from consideration of its neighbors. In some implementations, the traversal manager 150 is configured to identify (e.g., list) the possible traversal steps, i.e., vertices neighboring a current triangular face in a priority queue according to values of a valence-based penalty function for each neighboring vertex. In some implementations, the traversal order 152 includes a sequence of vertex identifiers from the vertex data 134.

The difference manager 160 is configured to produce difference data 162 between a point predicted by the vertices of a triangular face 132 of the triangular mesh and a neighboring vertex that is next according to the traversal order 152. In some implementations, the difference data 162 includes a triplet of bit strings of some length specified by a quantization procedure.

The encoding manager 170 is configured to encode the difference data 162 to produce encoded difference data 172. In some arrangements, the encoding manager 170 uses an entropy encoder such as, e.g., arithmetic coding or Huffman coding to perform the encoding of the difference data 162. In some implementations, there is as little variation in the difference data 162 as possible so that the difference data 162 has small entropy.

The decoding manager 180 is configured to decode the encoded difference data 172 to produce decoded difference data 182. Given the decoded difference data 182 and the predictions made by each respective triangular face 132 in the triangular mesh, each of the vertices 134 of the triangular mesh may be calculated (e.g., deduced).

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the compression computer 120 can be, or can include, any type of hardware and/or software configured to process attributes. In some implementations, one or more portions of the components shown in the components of the compression computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 120 can be, or can include, a software module configured for execution by at least one processor (not shown). In some implementations, the functionality of the components can be included in different modules and/or different components than those shown in FIG. 1.

Although not shown, in some implementations, the components of the compression computer 120 (or portions thereof) can be configured to operate within, for example, a data center (e.g., a cloud computing environment), a computer system, one or more server/host devices, and/or so forth. In some implementations, the components of the compression computer 120 (or portions thereof) can be configured to operate within a network. Thus, the components of the compression computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the mesh manager 130 (and/or a portion thereof), the valence manager 140 (and/or a portion thereof), the traversal manager 150 (and/or a portion thereof), the difference manager 160 (and/or a portion thereof), the encoding manager 170 (and/or a portion thereof), and the decoding manager 180 (and/or a portion thereof) can be a combination of a processor and a memory configured to execute instructions related to a process to implement one or more functions.

Figure 2:
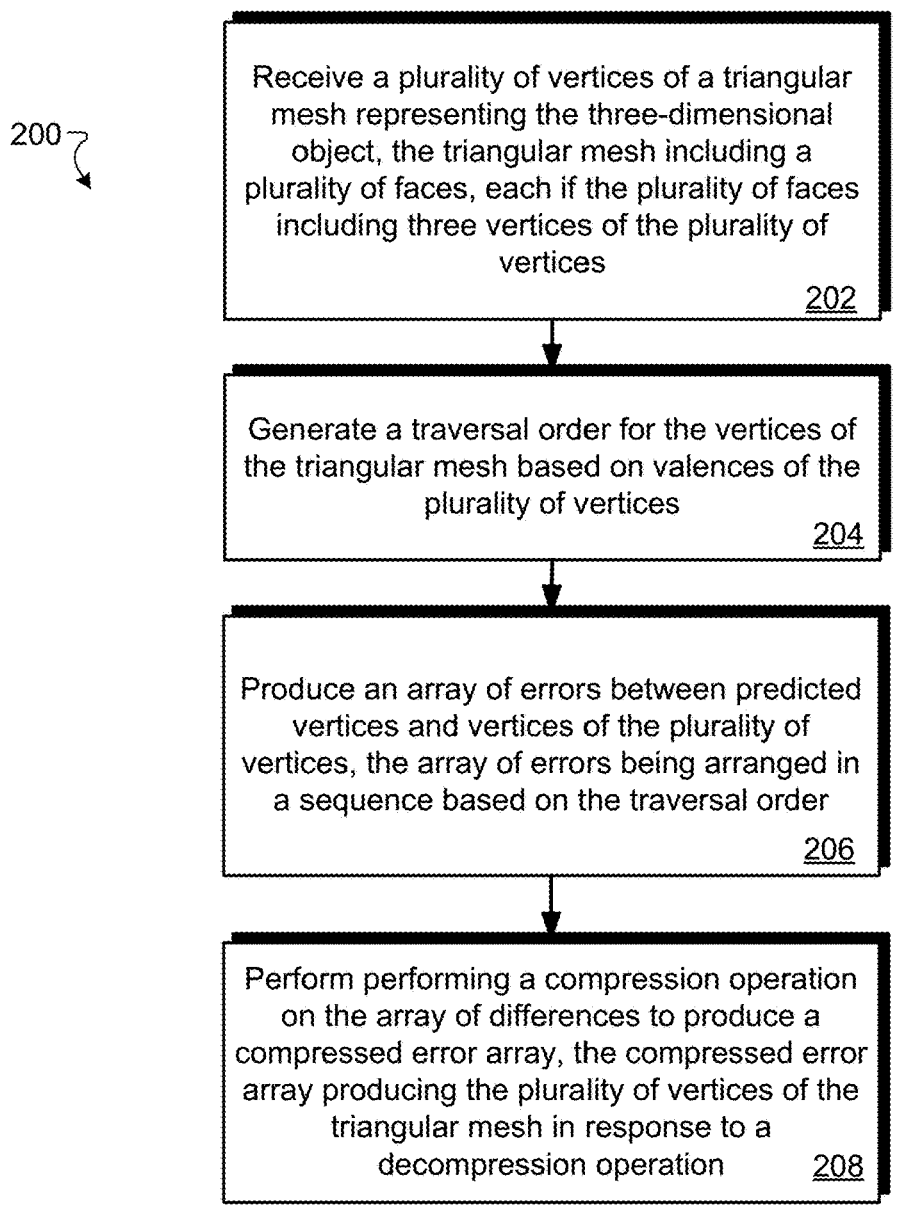
FIG. 2 is a diagram that illustrates an example method of performing the improved techniques within the electronic environment shown in FIG. 1.

FIG. 2 is a flow chart depicting an example method 200 of compressing triangular mesh data. The method 200 may be performed by software constructs described in connection with FIG. 1, which reside in memory 126 of the user device computer 120 and are run by the set of processing units 124.

At 202, the compression computer 120 (FIG. 1) receives a plurality of vertices of a triangular mesh representing the three-dimensional object. The triangular mesh includes a plurality of faces, each of the plurality of faces including three vertices of the plurality of vertices. In some implementations, the three vertices are replaced by indices that point to vertices.

At 204, the compression computer 120 generates a traversal order for the vertices of the triangular mesh based on valences of the plurality of vertices. For example, the traversal order may be generated based on a penalty function that increases with increased differences in valences between vertices of a triangular face and a vertex not included in that triangular face.

At 206, the compression computer 120 produces an array of errors between predicted vertices and vertices of the plurality of vertices. The array of errors is arranged in a sequence based on the traversal order.

At 208, the compression computer 120 performs a compression operation on the array of differences to produce a compressed error array. The compressed error array produces the plurality of vertices of the triangular mesh in response to a decompression operation.

Figure 3:
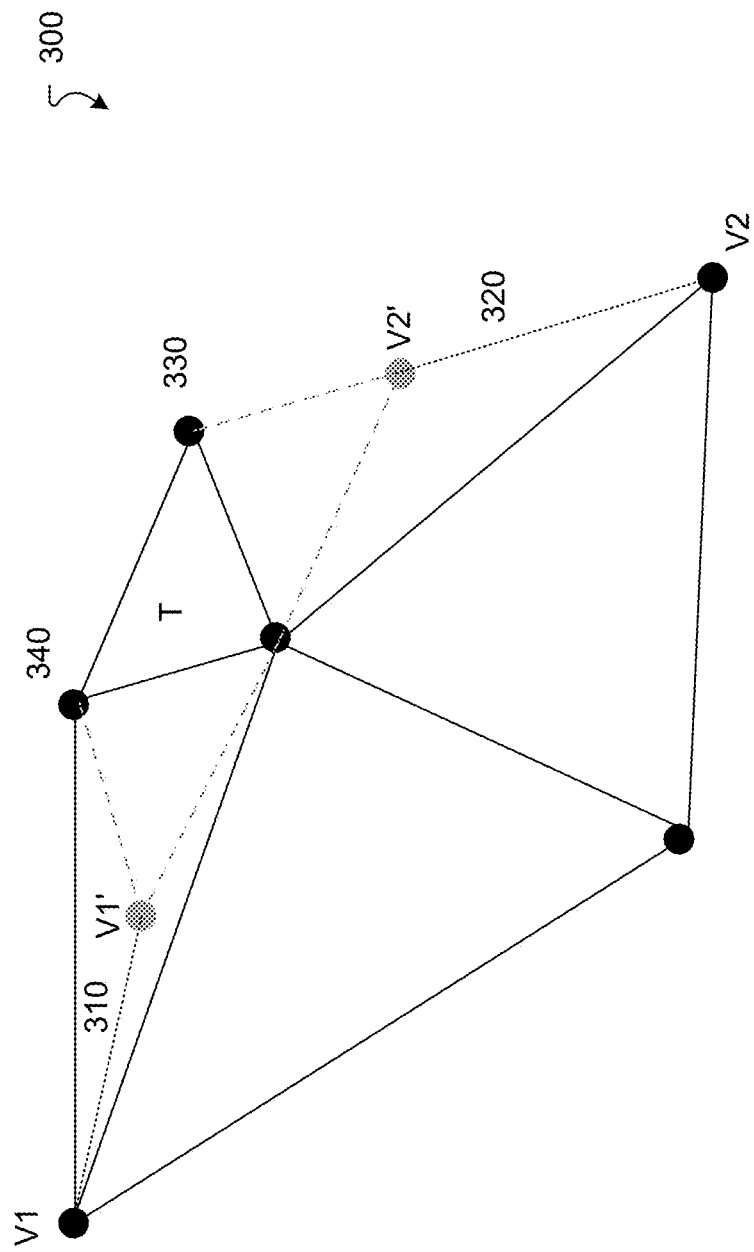
FIG. 3 is a diagram that illustrates example generation of prediction error in a triangular mesh according to the improved techniques described herein.

FIG. 3 is a diagram illustrating an example triangular mesh 300 and an example generation of prediction error. In this example, the triangle labeled "T" is the current triangular face for the purpose of generating a traversal order. One of the points of the triangle was a previous neighboring vertex to a previous triangular face.

In generating the traversal order, one can minimize the prediction error from neighboring vertices, in this case labeled "V1" and "V2." In some implementations, a predicted vertex position is generated using a parallelogram prediction method as illustrated in FIG. 3. In the parallelogram prediction method, a parallelogram is formed from the triangle T. The vertex furthest from the triangle T would then be the prediction point for a neighboring vertex of the triangular mesh.

As shown in FIG. 3, there are two neighboring vertices V1 and V2, and hence two possible traversal steps that may be selected as the next traversal step. In one example, a parallelogram is formed by a predicted vertex V1' opposite the vertex 330. V1' is the predicted vertex to be compared with the vertex V1. The error vector 310 is the difference between V1 and V1'. In another example, a parallelogram is formed by a predicted vertex V2' opposite the vertex 340. V2' is the predicted vertex to be compared with the vertex V2. The error vector 320 is the difference between V2 and V2'.

In some implementations, the predicted vertex may be derived using an alternative method. For example, predicted vertex V1' may be derived by mirroring the vertex 330 across the side opposite the vertex 330.

Selecting a traversal order based directly on minimal prediction error can be too computationally demanding for compression. Rather, the approach taken herein involves defining a penalty function based on vertex valences. This approach, and variations thereof, are described in at least FIG. 4

Figure 4:
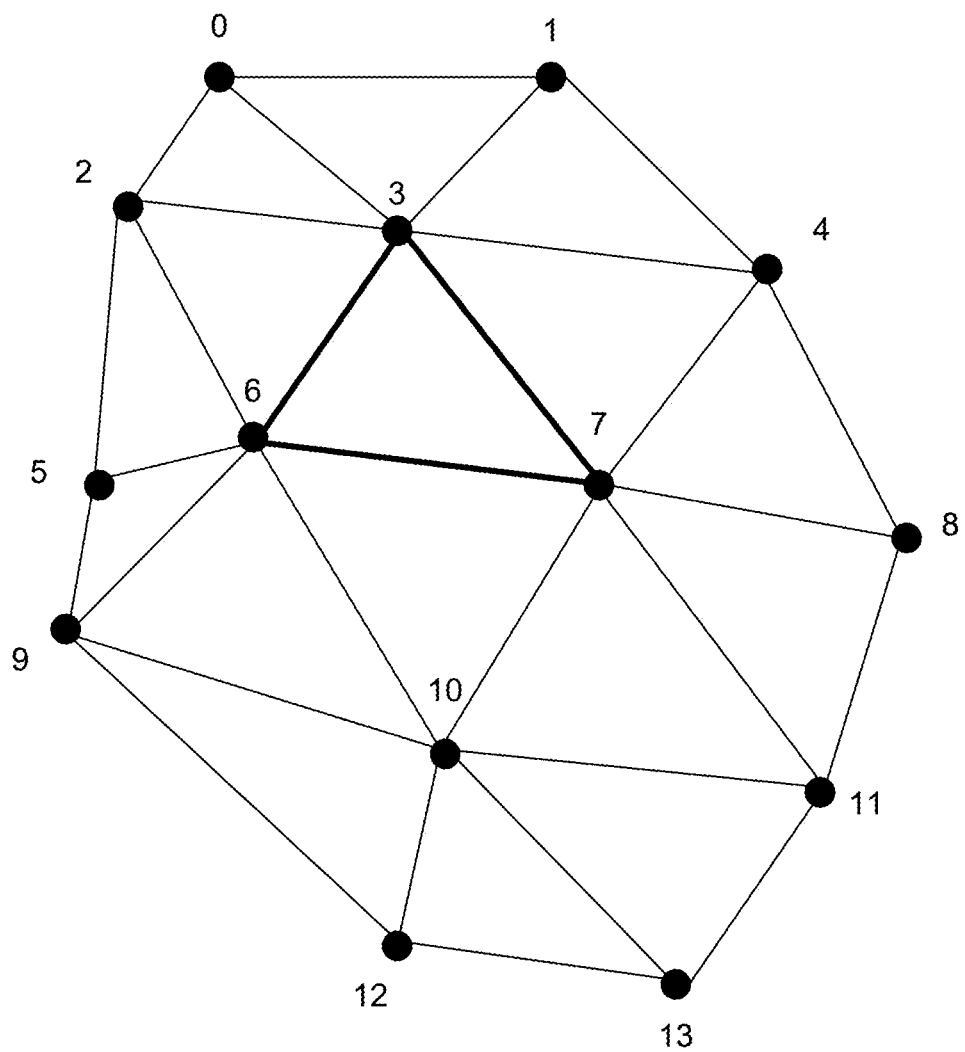
FIG. 4 is a flow chart that illustrates an example valence-based traversal within the electronic environment shown in FIG. 1.

FIG. 4 is a diagram illustrating an example triangular mesh with vertex identifiers at each vertex. The mesh includes interior vertices (e.g., vertices with indices 3, 6, 7, 10) and corner vertices (e.g., vertices with indices 0, 1, 2, 4, 5, 8, 9, 11, 12, 13).

The approach defined herein according to the above-described improved techniques can be initiated by selecting an initial triangular face. In FIG. 3, that face is defined by the vertices with indices 3, 6, and 7 and is bolded. The next traversal step is one of the neighboring vertices (i.e., vertices with indices 2, 4, 10).

Rather than explicitly computing the prediction point and error for all vertices, the approach defined herein involves defining a valence-based penalty function by which the next traversal step is selected. One such penalty function takes the form $$|\text{valence}(A)-\text{valence}(B)|+|\text{valence}(C)-\text{valence}(Y)|,$$

where A and B are vertices of the triangle closes to the neighboring vertex ("stationary vertices"), C is the vertex of the triangle opposite to the neighboring vertex ("nonstationary vertex"), and Y is the neighboring vertex. As disclosed above, valence(A) is defined to be the number of adjacent vertices to the vertex A (i.e., the number of spokes emanating from the vertex A).

In the example illustrated in FIG. 4, valence(3)=6, valence(6)=6, and valence(7)=6. Nevertheless, for the neighboring vertices, valence(2)=4, valence(4)=4, and valence(10)=6. In this case, according to the penalty function, the vertex 10 is placed first in a priority queue, while the vertices 2 and 4 are placed after in the queue. Accordingly, the vertex 10 would be the next, tentative step in the traversal order. This can be the case because the triangles defined by 3, 6, 7 and 6, 10, 7 are about similar.

Nevertheless, this penalty function-based selection process only provides a single step in a traversal that may render some vertices of the triangular mesh unreachable. In such an event, in some implementations, the traversal manager 150 (FIG. 1) may return to the initial triangle and select as the next traversal step the next vertex in the priority queue (e.g., vertex 4). In some implementations, the priority queue remains filled with other neighboring vertices selected from earlier steps. Accordingly, after two steps, there may be four vertices in the priority queue.

In some arrangements, the valence-based penalty function described above is instead a weighted sum of the absolute value terms, e.g., $$\alpha|\text{valence}(A)-\text{valence}(B)|+\beta|\text{valence}(C)-\text{valence}(Y)|,$$

where $\alpha$ and $\beta$ are weights chosen according to some specified criterion. For example, in some implementations, the weights are chosen as part of a tuning process that matches traversal steps derived using minimum prediction error as a criterion. In some arrangements, the weights are chosen to account for corner vertices in the penalty evaluation.

Once the traversal order has been determined for all vertices of the triangular mesh, the difference manager 160 then computes the differences between the predicted vertices (e.g., according to the parallelogram method) and the respective neighboring vertices. These differences are stored in an array which is then compressed by the encoding manager 170 using an entropy encoder.

The decoding manager 180 then decompresses the compressed differences. From these differences and the vertices of the initial triangle, all of the vertices of the triangular mesh may be determined by computing the next predicted vertex and adding the decompressed error.

Figure 5:
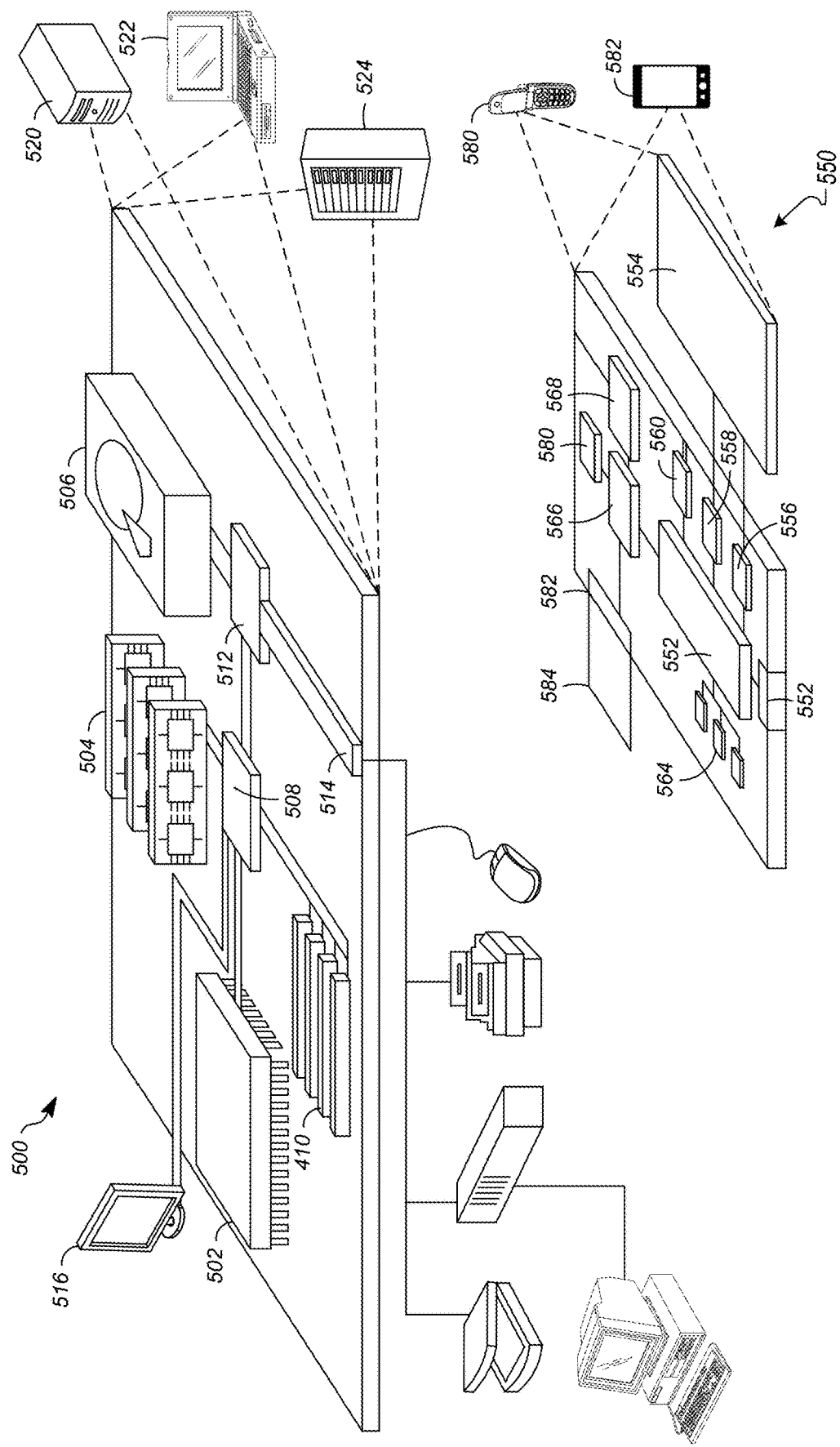
FIG. 5 illustrates an example of a computer device and a mobile computer device that can be used with circuits described here.

FIG. 5 illustrates an example of a generic computer device 500 and a generic mobile computer device 550, which may be used with the techniques described here.

As shown in FIG. 5, computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 450, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
receiving, by processing circuitry of a computer configured to process information related to a three-dimensional object, a plurality of vertices of a triangular mesh representing the three-dimensional object, the triangular mesh including a plurality of faces, each of the plurality of faces defined by three vertices of the plurality of vertices;
generating, by the processing circuitry, a traversal order for the vertices of the triangular mesh based on valences of the plurality of vertices, including generating a value of a penalty function for a set of neighboring vertices of the plurality of vertices not on a current face of the plurality of faces;
producing, by the processing circuitry, an array of errors between predicted vertices and vertices of the plurality of vertices, the errors in the array of errors being arranged in a sequence based on the traversal order; and
performing, by the processing circuitry, a compression operation on the array of errors to produce a compressed error array, the compressed error array being used to produce the plurality of vertices of the triangular mesh in response to a decompression operation.

2. The method as in claim 1, wherein
the value of the penalty function is based on the valence of each vertex included in the current face and a valence of the set of neighboring vertices; and
wherein generating the traversal order includes selecting, as the neighboring vertex from which the error of the array of errors is produced, the neighboring vertex of the set of neighboring vertices for when the value of the penalty function satisfies a condition.

3. The method as in claim 2, wherein generating the value of the penalty function for each of the set of neighboring vertices includes:
producing a first difference between the valence of a first vertex of the current face and the valence of a second vertex of the current face;
producing a second difference between the valence of a third vertex of the current face and the valence of the neighboring vertex; and
producing, as the value of the penalty function, a sum of the first difference and the second difference.

4. The method as in claim 2, wherein the generating the value of the penalty function for each of the set of neighboring vertices includes:
producing a first difference between the valence of a first vertex of the current face and the valence of a second vertex of the current face;
producing a second difference between the valence of a third vertex of the current face and the valence of the neighboring vertex;
generating a first weight and a second weight based on a predefined criterion; and
summing a product of the first weight and the first difference and a product of the second weight and the second difference.

5. The method as in claim 2, wherein the generating the value of the penalty function for each of a set of neighboring vertices includes:
producing a first difference between the valence of a first vertex of the current face and the valence of a second vertex of the current face;
producing a second difference between the valence of a third vertex of the current face and the valence of the neighboring vertex;
generating a first weight and a second weight based whether the neighboring vertex is a corner vertex of the triangular mesh; and
summing a product of the first weight and the first difference and a product of the second weight and the second difference.

6. The method as in claim 2, further comprising:
generating a priority queue into which each of the set of neighboring vertices is placed according to the value of the penalty function;
performing an assessment as to whether any vertices of the plurality of vertices would be excluded from the production of the array of differences based on the traversal order generated based on the selection of the neighboring vertex; and
in response to the selection of the neighboring vertex excluding another vertex of the plurality of vertices, selecting, as the neighboring vertex from which the error of the array of errors is produced, the neighboring vertex of the set of neighboring vertices that is next in the priority queue.

7. A computer program product comprising a non-transitory storage medium, the computer program product including code that, when executed by processing circuitry of a user device configured to process information related to a three-dimensional object, causes the processing circuitry to perform a method, the method comprising:
receiving a plurality of vertices of a triangular mesh representing the three-dimensional object, the triangular mesh including a plurality of faces, each of the plurality of faces including three vertices of the plurality of vertices;
generating a traversal order for the vertices of the triangular mesh based on valences of the plurality of vertices, including generating a value of a penalty function for a set of neighboring vertices of the plurality of vertices not on a current face of the plurality of faces;
producing an array of errors between predicted vertices and vertices of the plurality of vertices, the array of errors being arranged in a sequence based on the traversal order; and
performing a compression operation on the array of errors to produce a compressed error array, the compressed error array being used to produce the plurality of vertices of the triangular mesh in response to a decompression operation.

8. The computer program product as in claim 7, wherein the value of the penalty function is based on the valence of each vertex included in the current face and a valence of the set of neighboring vertices; and
wherein generating the traversal order includes selecting, as the neighboring vertex from which the error of the array of errors is produced, the neighboring vertex of the set of neighboring vertices for which the value of the penalty function satisfies a condition.

9. The computer program product as in claim 8, wherein generating the value of the penalty function for each of the set of neighboring vertices includes:
producing a first difference between the valence of a first vertex of the current face and the valence of a second vertex of the current face;
producing a second difference between the valence of a third vertex of the current face and the valence of the neighboring vertex; and
producing, as the value of the penalty function, a sum of the first difference and the second difference.

10. The computer program product as in claim 8, wherein generating the value of the penalty function for each of the set of neighboring vertices includes:
producing a first difference between the valence of a first vertex of the current face and the valence of a second vertex of the current face;
producing a second difference between the valence of a third vertex of the current face and the valence of the neighboring vertex;
generating a first weight and a second weight based on a predefined criterion; and
summing a product of the first weight and the first difference and a product of the second weight and the second difference.

11. The computer program product as in claim 8, wherein generating the respective value of the penalty function for a neighboring vertex includes:
producing a first difference between the valence of a first vertex of the current face and the valence of a second vertex of the current face;
producing a second difference between the valence of a third vertex of the current face and the valence of the neighboring vertex;
generating a first weight and a second weight based whether the neighboring vertex is a corner vertex of the triangular mesh; and
summing a product of the first weight and the first difference and a product of the second weight and the second difference.

12. The computer program product as in claim 8, wherein the method further comprises:
generating a priority queue into which each of the set of neighboring vertices is placed according to the value of the penalty function;
performing an assessment as to whether any vertices of the plurality of vertices would be excluded from the production of the array of differences based on the traversal order generated based on the selection of the neighboring vertex; and
in response to the selection of the neighboring vertex excluding another vertex of the plurality of vertices, selecting, as the neighboring vertex from which the error of the array of errors is produced, the neighboring vertex of the set of neighboring vertices that is next in the priority queue.

13. An electronic apparatus configured to process information related to a three-dimensional object, the electronic apparatus comprising:
a memory; and
controlling circuitry coupled to the memory, the controlling circuitry being configured to:
receive a plurality of vertices of a triangular mesh representing the three-dimensional object, the triangular mesh including a plurality of faces, each of the plurality of faces including three vertices of the plurality of vertices;
generate a traversal order for the vertices of the triangular mesh based on valences of the plurality of vertices;
produce an array of errors between predicted vertices and vertices of the plurality of vertices, the array of errors being arranged in a sequence based on the traversal order; and
perform a compression operation on the array of errors to produce a compressed error array, the compressed error array being used to produce the plurality of vertices of the triangular mesh in response to a decompression operation;
wherein the controlling circuitry configured to generate the traversal order is further configured to generate a value of a penalty function for a set of neighboring vertices of the plurality of vertices not on a current face of the plurality of faces.

14. The electronic apparatus as in claim 13, wherein the value of the penalty function is based on the valence of each vertex included in the current face and a valence of the set of neighboring vertices; and
wherein the controlling circuitry configured to generate the traversal order is further configured to select, as the neighboring vertex from which the error of the array of errors is produced, the neighboring vertex of the set of neighboring vertices for which the value of the penalty function satisfies a condition.

15. The electronic apparatus as in claim 14, wherein the controlling circuitry configured to generate the penalty function for each of the set of neighboring vertices is further configured to:
produce a first difference between the valence of a first vertex of the current face and the valence of a second vertex of the current face;
produce a second difference between the valence of a third vertex of the current face and the valence of the neighboring vertex; and produce, as the value of the penalty function, a sum of the first difference and the second difference.

16. The electronic apparatus as in claim 14, wherein the controlling circuitry configured to generate the penalty function for each of the set of neighboring vertices is further configured to:
produce a first difference between the valence of a first vertex of the current face and the valence of a second vertex of the current face;
produce a second difference between the valence of a third vertex of the current face and the valence of the neighboring vertex;
generate a first weight and a second weight based on a predefined criterion; and
sum a product of the first weight and the first difference and a product of the second weight and the second difference.

17. The electronic apparatus as in claim 14, wherein the controlling circuitry configured to generate the penalty function for each of the set of neighboring vertices is further configured to:
produce a first difference between the valence of a first vertex of the current face and the valence of a second vertex of the current face;
produce a second difference between the valence of a third vertex of the current face and the valence of the neighboring vertex;
generate a first weight and a second weight based whether the neighboring vertex is a corner vertex of the triangular mesh; and
sum a product of the first weight and the first difference and a product of the second weight and the second difference.

18. The electronic apparatus as in claim 14, wherein the controlling circuitry is further configured to:
generate a priority queue into which each of the set of neighboring vertices is placed according to the value of the penalty function;
perform an assessment as to whether any vertices of the plurality of vertices would be excluded from the production of the array of differences based on the traversal order generated based on the selection of the neighboring vertex; and
in response to the selection of the neighboring vertex excluding another vertex of the plurality of vertices, select, as the neighboring vertex from which the error of the array of errors is produced, the neighboring vertex of the set of neighboring vertices that is next in the priority queue.

* * * * *